United States Patent Office 3,208,875
Patented Sept. 28, 1965

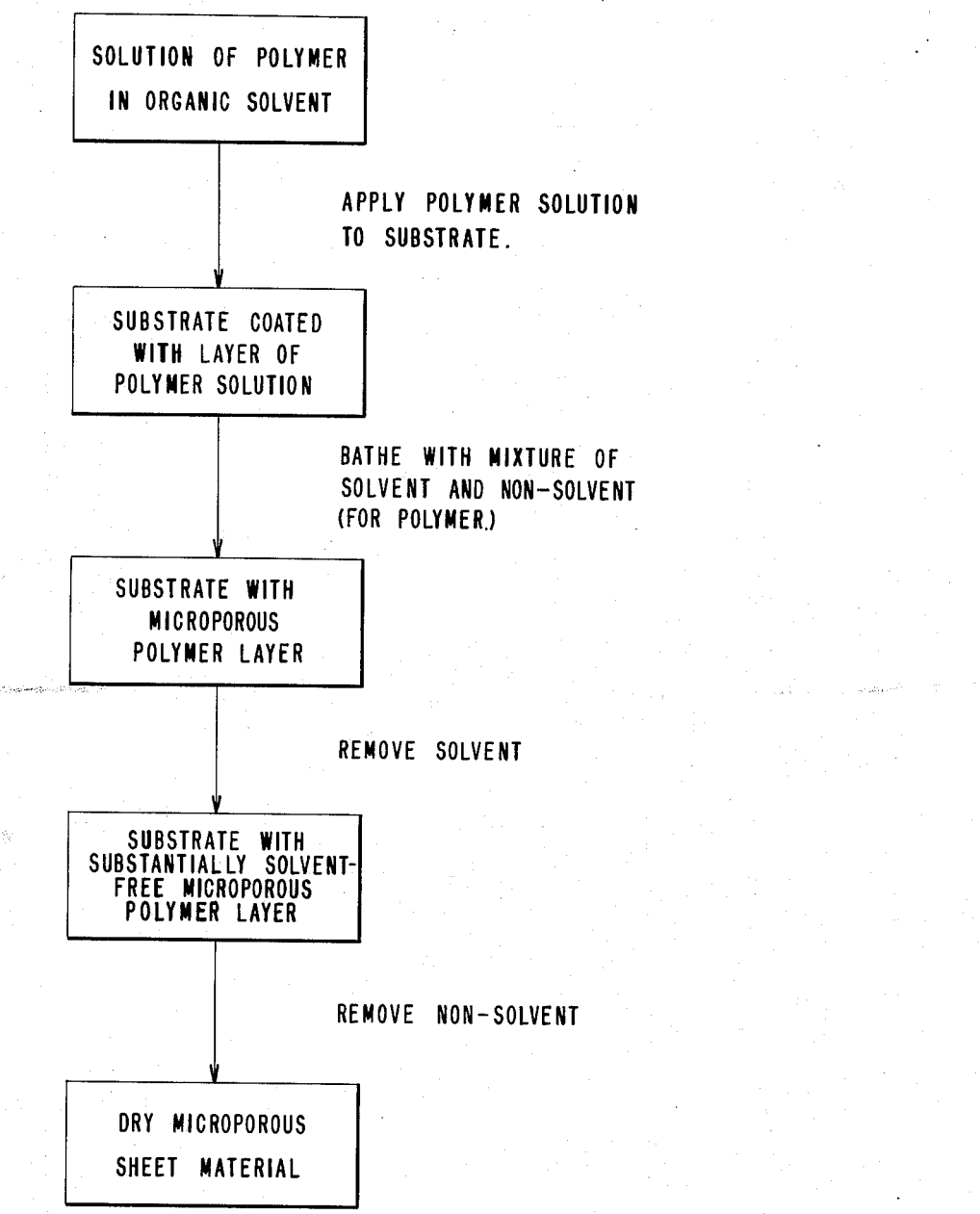

3,208,875
METHOD OF MAKING VAPOR PERMEABLE SHEET MATERIALS
Ellsworth K. Holden, Newburgh, N.Y., assignor to E. I. du Pont de Nemours and Company, Wilmington, Del., a corporation of Delaware
Filed Jan. 5, 1962, Ser. No. 164,589
23 Claims. (Cl. 117—135.5)

This invention relates to a new and improved method of making vapor permeable sheet materials of the type which comprise a microporous polymeric layer. Preferred embodiments of the invention concern the manufacture of leather-like sheet materials having a microporous layer of durable elastomeric material in superposed adherence with a fabric or other porous fibrous sheet material.

There are many important uses for vapor permeable sheet materials comprising a microporous polymeric layer in the form of an unsupported film or in the form of an adherent coating on a porous reinforcing substrate. For example, shoe-uppers, upholstery and clothing can be made from flexible vapor permeable sheet materials having a microporous layer of elastomeric polymer integrally united to a woven or nonwoven fabric. Sheet materials of this type are known which are very much like leather in durability, eye appeal and comfort characteristics.

Unfortunately, the desired balance of leather-like properties has not been obtainable by most of the previously known methods. Some of the best results to date, however, have been obtained with a method comprising the steps of coating a fabric with a layer of a solution of an elastomeric polymer in an organic solvent, bathing the layer with water or another polymer nonsolvent that is miscible with the organic solvent until the layer is free of organic solvent and coagulated into a microporous structure, and then drying the resultant microporous layer. But such a method has been known to yield the necessary microporous coating that is substantially free of macropores and that does not collapse and lose most or all of its vapor permeability during oven drying only when the method contains one of the following additional steps:

(1) Exposing the layer of polymer solution to a humid atmosphere having a controlled predetermined relative humidity for a period of time before it is bathed by immersion in a body of nonsolvent.

(2) Admixing with the polymer solution a carefully controlled amount of water or other nonsolvent to convert the solution to a substantially colloidal polymeric dispersion but not quite enough to gel it.

(3) Admixing with the polymer solution enough water or other nonsolvent to render the resulting mixture separable into a polymeric gel portion and a liquid portion, the gel portion then being separated and used for coating the fabric.

While excellent results are obtainable by employing the method which results from adding one of these three steps, in view of the limitations associated therewith there is definite room for improvement in each case. For example, with reference to step (1), it would be desirable if the processing time and air conditioning expense of using a closely controlled atmosphere could be eliminated.

With reference to step (2), it would be desirable if optimum results could be achieved without the need for adding an accurataely predetermined quantity of nonsolvent to the solution to bring it to a relatively narrow endpoint range that is just short of the gel point. Associated with the narrow range of the preferred endpoint and its tendency to fluctuate from batch to batch of a given polymer is the danger of missing the desired endpoint and thereby either rendering the solution useless or obtaining a product with defective physical properties.

With reference to step (3), it would frequently be desirable to have a coating composition that is lower in viscosity and/or lower in solids content than the separated gel; and it would be desirable to eliminate the separation operation.

It is therefore an important object of this invention to provide a new and improved method of making vapor permeable sheet materials which are made up either partly or entirely of a microporous polymeric layer.

A more specific object is the provision of a method of making flexible vapor permeable sheet materials having a microporous layer of elastomeric polymer in superposed adherence with a fabric or other porous reinforcing substrate.

Another object is the provision of an economical, easily controlled method of making such sheet materials which are consistently comparable with shoe-upper natural leather in durability, eye appeal and comfort characteristics.

Still another object is the provision of an improved method of making such sheet materials by the aforementioned solution-coating/nonsolvent-bathing technique without using any of the above-listed additional steps and without encountering the limitations associated therewith.

Other important objects will be apparent from the description of the invention which follows.

The novel method of this invention in its broadest form comprises (a) applying to a substrate a layer of a solution of polymer in an organic solvent, (b) bathing the layer with a mixture of an organic solvent for the polymer and a nonsolvent for the polymer that is at least partially miscible with said solvent until the layer is coagulated into a cellular structure of interconnected micropores, the solvent:nonsolvent weight ratio in said mixture being about from 10:90 to 95:5, (c) removing substantially all of the solvent from the layer, and (d) removing substantially all of the nonsolvent from the resulting substantially solvent-free microporous layer; the polymer in step (a) being selected so that it will have a maximum elastic deformation strength (as defined below) of at least 100 pounds per square inch from the end of step (c) until the end of step (d).

A flow sheet of the process appears in the drawing.

In certain preferred embodiments of the invention, step (c) in the above-described method is accomplished by bathing the layer with a nonsolvent for the polymer that is at least partially miscible with said solvent, and step (d) is accomplished by drying the layer, for example, in an oven or equivalent drying means.

In a particularly preferred embodiment of the invention, a solution of polymer, prior to its application to the substrate, is admixed with a nonsolvent for the polymer that is at least partially miscible with the polymer solvent, the amount of nonsolvent being up to but not including the amount which starts to transform the polymer solution into a substantially colloidal polymeric dispersion. In other words, the addition of nonsolvent is stopped before the polymer starts to separate out of solution as colloidal or substantially colloidal particles, which particles tend to give the dispersion a hazy or opalescent appearance in contrast with the usual relatively clear appearance of the polymer solution. The term "polymer," as used in the description of this invention, designates a polymeric filmforming material composed either of pure polymer or blends thereof with additives, for example curvatives, coloring agents, plasticizers, stabilizers and fillers.

A preferred major polymeric component of the polymer solution when making leather-like sheet materials is a polyurethane elastomer made by reacting an organic diisocyanate with an active hydrogen containing polymeric material such as a polyalkyleneether glycol or a hydroxyl-terminated polyester to produce an isocyanate-terminated polyurethane prepolymer, and reacting the resulting prepolymer with a chain-extending compound having two active hydrogen atoms bonded to amino-nitrogen atoms. Hydrazine and N-methyl-bis-aminopropylamine are preferred chain extenders; however, others which are useful include dimethyl-piperazine, 4-methyl-m-phenylene-di- blends thereof with additives, for example curatives, coloring agent, plasticizers, stabilizers and fillers.

The polyurethane elastomer can be prepared by first mixing a molar excess of the diisocyanate with the active hydrogen containing polymeric material and heating the mixture at about 50–120° C. until the prepolymer is formed. Or, the diisocyanate can be reacted with a molar excess of the active hydrogen containing polymeric material, and the reaction product capped by reacting it with more diisocyanate to form the prepolymer.

Aromatic, aliphatic and cycloaliphatic diisocyanates or mixtures thereof can be used in forming the prepolymer. Such diisocyanates are, for example, tolylene-2,4-diisocyanate, tolylene-2,6-diisocyanate, m-phenylene diisocyanate, biphenylene 4,4'-diisocyanate, methylene bis(4-phenyl isocyanate), 4-chloro-1,3-phenylene diisocyanate, naphthalene - 1,5 - diisocyanate, tetramethylene - 1,4-diisocyanate, hexamethylene - 1,6 - diisocyanate, decamethylene-1,10-diisocyanate, cyclohexylene-1,4-diisocyanate, methylene bis-(4-cyclohexyl isocyanate) and tetrahydronaphthalene diisocyanate. Arylene diisocyanates, that is, isocyanates in which the isocyanate groups are attached to an aromatic ring are preferred. In general they react more readily than do alkylene diisocyanates.

A polyalkyleneether glycol is the preferred active hydrogen containing polymeric material for the prepolymer formation. The most useful polyglycols have a molecular weight of 300 to 5000, preferably 400 to 2000, and include, for example, polyethyleneether glycol, polypropyleneether glycol, polytetramethyleneether glycol, polyhexamethyleneether glycol, polyoctamethyleneether glycol, polynonamethyleneether glycol, polydecamethyleneether glycol, polydodecamethyleneether glycol and mixtures thereof. Polyglycols containing several different radicals in the molecular chain such as, for example, the compound

$$HO(CH_2OC_2H_4O)_nH$$

wherein $n$ is an integer greater than 1 can also be used.

Polyesters which can be used instead of or in conjunction with the polyalkleneether glycols are, for example, those formed by reacting acids, esters or acid halides with glycols. Suitable glycols are polymethylene glycols, such as ethylene-, propylene-, tetramethylene-, decamethylene glycol, substituted polymethylene glycols such as 2,2-dimethyl-1,3-propanediol, cyclic glycols such as cyclohexanediol and aromatic glycols such as xylylene glycol. Aliphatic glycols are generally preferred when maximum product flexibility is desired. These glycols are reacted with aliphatic, cycloaliphatic or aromatic dicarboxylic acids or lower alkyl esters or ester forming derivatives thereof to produce relatively low molecular weight polymers, preferably having a melting point of less than about 70° C., and molecular weight like those indicated for the polyalkyleneether glycols. Acids for preparing such polyesters are, for example, succinic, adipic, suberic, sebacic, terephthalic and hexahydroterephthalic acids and the alkyl and halogen substituted derivatives of these acids.

The chain extension reaction is usually carried out at a temperature below 120° C. and often at about room temperature, particularly for hydrazine-extended polymers. During the reaction, prepolymer molecules are joined together into a substantially linear polyurethane polymer, the molecular weight of which is usually at least 5000 and sometimes as high as 300,000. The reaction can be carried out without a solvent in heavy duty mixing equipment or it can be carried out in a homogeneous solution. In the latter case it is convenient to use as a solvent one of the organic solvents to be employed in the polymer solution.

Since the resulting polyurethane polymer has rubber-like elasticity, it is referred to as an "elastomer," although the degree of elasticity and rubber-like resilience may vary widely from product to product depending on the chemical structure of the polymer and the materials in combination with it.

A vinyl chloride polymer is another preferred component of the polymer solution when making leather-like sheet materials. Superior product abrasion resistance is obtainable when a vinyl chloride polymer is used in combination with an elastomer such as the polyurethane described above. When making a shoe upper material or the like from a blend of polyurethane elastomer and vinyl chloride polymer, I generally prefer to employ a major proportion (over 50 weight percent) of the former and a minor proportion (less than 50 weight percent) of the latter. Useful vinyl chloride polymers include polyvinyl chloride and copolymers of a major proportion, preferably at least 80%, of vinyl chloride and a minor proportion of another ethylenically unsaturated monomer, such as vinyl acetate, vinylidene chloride, or diethyl maleate.

A large number of other polymers, either individually or incombination, can be used as the polymeric component of the polymer solution. A polymeric component is selected which has a maximum elastic deformation strength, or "MEDS," of at least 100 pounds per square inch (preferably about 130–300 p.s.i.) from the time that substantially all the polymer solvent has been removed from the solution layer on the substrate in accordance with the present method until substantially all the nonsolvent has been removed from the layer. The liquids and temperatures used in the bathing and drying steps are additional factors which, along with the polymer properties, govern the MEDS, and a selection of these factors is made along with the properties of the particular polymeric component to be used in order to avoid allowing the MEDS of the polymeric component to fall below 100 p.s.i. Various additives which are sometimes present in the polymeric component also affect the MEDS, as will be apparent to those skilled in the art. For example, plasticizers tend to lower it and fillers tend to raise it.

The MEDS of the polymeric components to be used in making the microporous layer is determined by measuring and plotting the stress-strain curve of a substantially void-free (e.g., solution cast) film of the polymeric component and drawing a straight line tangent and coincident with the initial straight portion of the stress-strain curve representing elastic deformation. If the polymer is to be used in admixture with additives in practicing this invention, the MEDS is measured on the polymer-additive blend. MEDS is the stress at the point at which the aforementioned straight line departs from the stress-strain curve. The stress-strain data is preferably determined on an Instron Tensile Tester Model TTB at a speed of 100% elongation per minute using a one-half inch wide rectangular sample, usually about 10 to 20 mils thick, and one inch between grips. The test temperature to be used in determining the MEDS of a particular polymeric component by the method just described will be the highest temperature to which the microporous coating will be subjected in the practice of this invention during the bathing and drying steps. In order to reflect the effect of bathing liquid during drying on the bathed product wet therewith, MEDS is measured on a void-free sample saturated and in equilibrium with the last bathing liquid used prior to drying. In essence, the polymeric component and final bathing liquid are coupled so that upon completion of the bathing and solvent removal steps, while the coating is removed from the bathing liquid, and during and after drying, the polymeric component in the coating has a MEDS above the aforementioned limit.

The polymeric component can have an initial MEDS somewhat below 100 p.s.i. if the MEDS thereof has been raised to at least 100 p.s.i. by the time substantially all the solvent has been removed from the layer. If the MEDS of the polymeric component is too low, the product will have little or no vapor permeability due to collapse of the microporous structure during drying, especially during the late stages of drying (that is, during removal of the last few percent of nonsolvent).

Within the MEDS range specified above, the polymeric component of the solution from which the coating gel is formed can contain one or more of numerous types of polymers which are exemplified by the following: polyurethanes, vinyl halide polymers, polyamides, polyesteramides, polyesters, polyvinyl butyral, polyalphamethylstyrene, polyvinylidene chloride, alkyl esters of acrylic and methacrylic acids, chlorosulfonated polyethylene, copolymers of butadiene and acrylonitrile, cellulose esters and ethers, polystyrene and other polymers made from monomers containing vinyl groups. Synthetic organic polymers are generally preferred and elastomeric polymers of relatively high molecular weight are especially preferred.

When a polymer is used which is known to be compatible with plasticizers, for example a vinyl chloride polymer, it can be blended with known plasticizers therefor in an amount up to but not including the amount which causes the MEDS to drop below 100 p.s.i. Other known additives for polymeric compositions can also be added to the polymeric component, such as pigments, fillers, stabilizers and antioxidants.

The polymer component selected is dissolved in enough organic solvent to yield a solution having the desired solids content and viscosity. For doctor-knife application it is usually preferred to use a solution which, after addition of nonsolvent if any is employed in the solution, has a polymeric content of about 10–30 weight percent and a viscosity of about 10–500 poises. The organic solvent used in the solution as well as in the coagulation bathing step should be one that is miscible, preferably completely miscible, with the nonsolvent liquid to be used in practicing the invention. N,N-dimethyl formamide is a preferred solvent for the polymers soluble therein in view of its high solvent power for many of the preferred polymers as well as its high miscibility with the generally preferred nonsolvent liquids including water. Other useful solvents include dimethyl sulfoxide, tetrahydrofuran, tetramethyl urea, N,N-dimethyl acetamide, N-methyl-2-pyrrolindone, ethyl acetate, dioxane, butyl carbinol, toluene, phenol, chloroform, and gamma-butyrolactone. Also useful are blends of these solvents with various water-miscible liquids, such as ketones and alcohols which alone are often poor solvents for the polymer. One very useful blend is composed of dimethyl formamide and methyl ethyl ketone.

When the solvent is to be removed from the applied layer by drying, it should be more volatile than the nonsolvent used in the process.

Having prepared the polymer solution, an optional but generally preferred step is to admix with the solution a nonsolvent for the polymer, the nonsolvent being a liquid that is at least partially miscible with the organic solvent in the solution. Nonsolvents which can be admixed with the polymer solution in accordance with the present method include water, ethylene glycol, glycerol, glycol monoethyl ether, hydroxyethyl acetate, tertiary butyl alcohol, 1,1,1-trimethylol propane, methanol, ethanol, hexane, benzene, naphtha, toluene, tetrachloroethylene, chloroform and the like. When operable, water and blends thereof with water-miscible liquids are usually preferred.

Before the water or other nonsolvent is added to the polymer solution, it is preferably blended with a substantial proportion, for example from about 2 to 5 times its own weight, of an organic solvent of the type used in preparing the polymer solution. Addition of the nonsolvent to the solution should be done gradually and with stirring to prevent localized coagulation.

The nonsolvent is added in an amount up to but not including the amount which starts to transform the solution into a substantially colloidal dispersion of polymer particles. The preferred amount of nonsolvent to add is usually about 40–95%, and still more preferably about 70–90%, of the amount required to bring about initial indications of a hazy colloidal dispersion. If the polymer solution was clear initially, it will normally still be substantially clear after the nonsolvent has been added in the practice of this invention.

It is sometimes desirable to add a thickening agent to the polymer solution before it is applied to the substrate so as to cause an increase, preferably a considerable increase, in the solution viscosity. This is especially desirable when using a solution to which little or no nonsolvent is added.

As mentioned above, a prior art method of making vapor permeable leather-like sheets comprises the step of adding a nonsolvent to the polymer solution in sufficient quantity to transform it into a substantially colloidal dispersion. Best results are obtained in that method when the amount added is about midway between that which causes initial indications of a hazy colloidal dispersion and that which brings the mixture to its gel point. Since that method is characterized by a very narrow optimum endpoint range as well as a narrow useful endpoint range for any given polymer, and the best endpoint often varies from batch to batch of a given polymer, there is always the danger of missing the desired endpoint and thus obtaining either a useless solution or a defective final product. Although this limitation has not prevented that method from being used with some success, it has spurred the search for an even better method of making high quality leather-like sheet materials for the shoe and upholstery industries.

The advantageous results of the present invention in its preferred form are quite unexpectedly achieved by adding nonsolvent to the polymer solution in a broad endpoint range that is below and outside of the endpoint range of the prior art method. Moreover, the present method substantially eliminates the danger of missing an endpoint in the preferred range. In fact, the present method is surprisingly effective when no nonsolvent whatever is added to the polymer solution. Yet the present method permits relatively rapid coagulation of the coating in a liquid bath without first having to expose the coating to a closely controlled humid atmosphere as was required in the first prior art method discussed above. And the present method requires neither the separation of phases nor the use of a highly viscous, high solids coating composition which characterizes the third prior art method discussed above.

Since the polymer solution in this method is never dangerously close to its gel point prior to layer formation, it is substantially free of polymer gel particles. The occasional presence of such gel particles has been a drawback in prior art methods involving the use of a solution that is on the verge of gelling because the particles lead to a reduction in coating uniformity and resistance to damage by flexing.

One reason it is usually preferable in the present invention to add nonsolvent to the polymer solution, especially in the 40–95% range mentioned above, is that it helps insure against the formation of macrovoids in the coating, particularly when the substrate is a fibrous sheet having relatively low liquid permeability and the coated material is quickly immersed in the bathing liquid. It is believed that this is because the presence of a substantial proportion of nonsolvent in the polymer solution permits the use of less organic solvent for the polymer in the coagulation bathing step, which in turn reduces the tendency of the bathing liquid to force air bubbles out of the substrate into the coating in the early stages of the bathing operation.

Another reason it is usually preferable to add nonsolvent to the polymer solution in the 40–95% range, based on the amount needed to cause initial transformation of the coating composition from a solution to a colloidal dispersion, is that faster coagulating conditions can be used in the coagulation bathing step without interference with the attainment of a product that is finely microporous, highly vapor permeable, and resistant to damage by repeated flexing. However, under some circumstances it will be preferable to add little or no nonsolvent to the coating solution; for example, when it is permissible or desirable to use slow coagulation techniques or when the emphasis is on properties other than those just listed.

An experienced operator will have little difficulty in estimating the best amount of nonsolvent to be added to a solution of a particular type of polymer for the production of a particular type of product. An inexperienced operator can readily predetermine a desirable nonsolvent range by making a small trial run. For example, he can add to 5 small samples of the main body of solution 0%, 30%, 60%, 80% and 90% respectively of nonsolvent, based on the previously determined amount needed to cause initial transformation of the coating composition from a solution to a colloidal dispersion, complete the process in accordance with the teaching herein and according to his best judgment, select the sample product best fitted to the intended use, and calculate the proportionate amount of nonsolvent he wishes to add to the main body of solution.

After the nonsolvent, if any, has been added to the polymer solution, a layer of the solution is applied to a substrate. Coating methods which are useful for applying the layer are exemplified by doctor-knifing, extruding, dipping, spraying, brushing and roller-coating.

Leather replacements and other composite reinforced vapor permeable sheet products are produced by applying a layer of the solution to one or both sides of a flexible porous fibrous substrate, for example a non-woven fabric, a waterleaf, a woven or knitted fabric, leather, suede, or a man-made leather-like or suede-like sheet material. Or the solution layer can be interposed as a bonding layer between such sheet materials. The fibers of the substrate can be natural or synthetic, crimped or straight, organic or inorganic, continuous filament or staple, or a papermaking length. When bathed and dried in accordance with the method of this invention, the layer of solution becomes a microporous polymeric layer integrally united to the substrate.

An unsupported microporous film or sheet is obtained by applying the layer of solution to a removable substrate, preferably a smooth impervious substrate such as polished glass, stainless steel, aluminum foil, plastic film, or a fibrous substrate coated with a release coating, followed by the requisite bathing, solvent removal, drying, and stripping operations.

The substrate-supported layer of polymer solution is bathed with a mixture of an organic solvent for the polymer and a nonsolvent for the polymer, the nonsolvent being at least partially miscible with the solvent, until the layer is coagulated into a cellular structure of interconnected micropores. The solvent:nonsolvent weight ratio in the bathing mixture should be about from 10:90 to 95:5. Useful solvents and nonsolvents have been listed above in connection with preparing the polymer solution. It is usually preferred to use a bathing mixture having a solvent content of at least 50 weight percent.

Preferably the solution layer is immediately placed in contact with a body of the bathing mixture, either by sudden immersion therein, or by first floating it thereon. However, this bathing step can also be performed by subjecting the layer to a spray or a vapor of the bathing liquid, or by a combination of these and other known bathing techniques. "Bathing" is intended to mean causing the solvent-nonsolvent mixture, either in the form of a unitary body or in finely divided form, such as a spray or vapor, to come in contact with the solution layer.

The preferred solvent:nonsolvent weight ratio in the bathing mixture is usually about from 50:50 to 95:5, and still more preferably about from 70:30 to 90:10. It will seldom be desirable to use a ratio below 40:60. The best ratio to use in any specific case will be governed to a large extent by such factors as: (1) the amount of nonsolvent added to the polymer solution, (2) the viscosity of the substrate-supported layer of polymer solution, (3) the viscosity and temperature of the bathing mixture, and (4) whether the bathing mixture is used as a unitary body of liquid or in a finely divided form such as a spray, mist or vapor. To illustrate, in making a leather-like sheet material from a particular polymer solution by adding to the solution 50% of the amount of water that would cause initial indications of a colloidal dispersion, and immersing the applied layer in a 70:30 mixture of dimethyl formamide and water at 20° C., if one finds that the coagulated layer is "microporous" (containing pores visible to the unaided eye) instead of microporous, it is advisable to take a sample quantity of the solution and try adding more water, say about 80% of the amount that would cause initial transformation of the polymer solution to a colloidal dispersion. If the coagulated layer is still macroporous, it is advisable to modify the procedure according to one or more of the following: (a) increase the viscosity of the applied layer, for example by increasing the solids content of the polymer solution, by replacing a portion of the polymer with another polymer that yields a more viscous solution or by adding a thickening agent; (b) increase the viscosity of the bathing mixture, for example by replacing part of the water with glycerine; (c) increase the temperature of the bathing mixture, say to 50° C.; (d) use the bathing mixture in the form of a fine mist; (e) increase the dimethyl formamide:water ratio, say to about 90:10, in the bathing mixture.

If the substrate is a relatively thick or dense fibrous sheet, and there is a tendency towards the formation of blisters, air pockets or similar macrovoids in the coating as the coated sheet is immersed in the bathing mixture, it is advisable at least initially to float the coated sheet coating-side-down on the bathing mixture so that air entrapped in the substrate will not be forced into the coating. This is especially recommended practice when little or no nonsolvent has been added to the polymer solution, and the bathing mixture, in turn, has an organic solvent content near the recommended maximum of about 95%.

An organic solvent:nonsolvent ratio in the coagulation bathing step substantially above 95:5 is to be avoided to prevent bathing mixture from having a solvent action on the coating to the extent of either preventing a sufficient coagulating effect to yield micropores or causing any pores formed to collapse.

At the other extreme, there is usually no advantage, particularly with the preferred polyurethanes and vinyl chloride resins and blends thereof, in using less solvent in the coagulation bath than that needed to give a solvent: nonsolvent ratio of 70:30; this is true even when as much as about 95% of nonsolvent has been added to the polymer solution based on the amount that would cause initial transformation of the solution to a colloidal dispersion. This is not to say, of course, that with certain polymer solutions or with specific process conditions it will not be desirable or useful to have a solvent:nonsolvent ratio of less than 70:30, or of less than 50:50. However, as a general trend, there is more of a tendency towards pore collapse at the lower ratios. As indicated previously, the desired pore formation can often be controlled by other measures, one of the most practical measures being to raise the temperature of the first bath substantially above room temperature, say to about 40–60° C.

The next step is to remove substantially all the polymer solvent from the resulting coagulated microporous layer before at least the last appreciable portion of nonsolvent is removed therefrom. This can be done by subjecting the layer to drying conditions, for example in an oven or similar heat zone. Preferably, the solvent removal is done by bathing the microporous layer with water or another nonsolvent for the polymer that is at least partially miscible with the polymer solvent in the layer until the layer is substantially free of the polymer solvent. This solvent removal step serves to prevent substantial or total loss of porosity due to collapse of the cellular structure during removal of substantially all the nonsolvent which remains in the layer after the solvent has been removed.

When using the drying technique to remove solvent, it is usually best to use a final coagulation bath in which the solvent:nonsolvent weight ratio is near the specified minimum of about 10:90. At the stage when substantially all the solvent has been removed from the microporous layer by drying, I prefer that the layer contain at least 10% of the amount of nonsolvent that it is capable of absorbing.

When using the preferred bathing technique to remove solvent, the layer can be immersed in a separate bath of nonsolvent or in a series of baths of gradually decreasing solvent content. Or a stream of nonsolvent can be introduced into the first bath while the layer remains therein until the solvent content of the bath, and thus the solvent content of the layer, is reduced to zero or thereabouts. Or the nonsolvent can be in finely divided form such as a spray or mist during all or part of this bathing step.

The drying to remove solvent and the drying to remove at least the last appreciable portion of nonsolvent is preferably carried out in a heat zone in which there is force air circulation, and in which the temperature is about 80–130° C.

Microporous sheet materials are obtainable by this method which are surprisingly smooth and free of the "orange peel" type of surface irregularities which have characterized products of some of the closest prior art methods.

When the microporous films obtainable by this novel method are integrally united during or after their formation to porous fibrous substrates, it is possible to make leather-like sheet materials having advantages over prior leather replacements as well as over natural leather for many applications. For example, shoe-upper material is obtainable which combines natural leather-like appearance, durability and comfort characteristics with freedom from the wide periodic fluctuation in cost and variation in properties known to characterize natural leather. Moreover, the availability of the product in continuous lengths and any desired width in substantially uniform and blemish-free quality gives it a distinct advantage over natural leather for such applications as upholstery, luggage, table and roll coverings, ink rollers and sport jackets.

The method of this invention is adaptable to the rapid and economical production of vapor permeable sheet materials composed partly or entirely of a microporous polymeric layer. A consistent yield of uniformly high quality shoe-upper material and the like is readily obtainable by this method.

The more important advantages of this method have been mentioned above and may be summarized briefly as follows:

(1) The optimum endpoint range in the addition of nonsolvent to the polymer solution is broad enough so that there is little or no danger of missing the desired endpoint and thereby rendering the solution useless or the final product defective.

(2) Useful results are obtainable when no nonsolvent at all is added to the polymer solution.

(3) Optimum results are obtainable by subjecting the layer of polymer solution to direct and immediate contact with a body of liquid to coagulate it relatively rapidly and economically without first having to expose the layer to a closely controlled humid atmosphere.

(4) The polymer content and viscosity of the polymer solution coating composition can be varied over a wide range to adapt it to any coating method and to any coating thickness.

(5) There is no step requiring the separation of phases before the polymer solution is applied to the substrate.

(6) Improvements in product smoothness, uniformity, and flex durability are obtainable by this method.

The examples which follow are given for the purpose of illustrating the invention. All quantities shown are on a weight basis unless otherwise indicated.

*Example 1*

A 20% solution of polyurethane elastomer is prepared by first mixing 3343 parts of polytetramethyleneether glycol of about 1000 molecular weight with 291 parts of tolylene-2,4-diisocyanate and heating the mixture for 3 hours at 90° C. Then 2485 parts of the resulting hydroxyl-end-group-containing dimer are mixed with 570 parts of methylene-bis-(4-phenyl-isocyanate). This mixture is heated for one hour at 80° C., yielding a prepolymer with isocyanate end groups. The prepolymer is dissolved in 10,000 parts of N,N-dimethyl formamide (sometimes referred to simply as dimethylformamide), and the resulting solution is added slowly to a solution consisting of 50 parts of chain extender dissolved in 1,710 parts of dimethyl formamide. The chain extender consists of N-methyl-bis-amino-propylamine and hydrazine hydrate in a molar ratio of 40:60. The resulting reaction mixture is stirred at 40° C. for 30 minutes to form a polyurethane solution having a viscosity of about 115 poises and a polymer content of about 20%.

A polymer solution consisting of 10.5% polyurethane elastomer, 5.7% polyvinyl chloride and 83.8% dimethyl formamide is prepared by admixing a 12% solution in dimethyl formamide of polyvinyl chloride with a suitable amount of the 20% polyurethane solution. The MEDS (maximum elastic deformation strength) of the polymeric component of this solution is found to be 180 p.s.i. by casting a void-free film from a sample of the solution, soaking it in water for several days, and carrying out the MEDS determination as previously described. At 100° C., the temperature to be used for drying the coated fabric in this example, the film has a MEDS of over 100 p.s.i.

Next, 10 parts of a 1:4 blend of water and dimethyl formamide are gradually added to 100 parts of the polymer solution with stirring. Water is a nonsolvent for the polymeric component of the solution and is highly miscible with dimethyl formamide, the polymer solvent component.

If the nonsolvent-solvent blend is slowly and carefully added to a sample of the polymer solution in an amount sufficient to bring about initial indications that the solution is becoming a hazy substantially colloidal dispersion, it will be found that 18 parts of the blend have been added. The addition of about 2 parts more will bring the solution very close to its gel point. Thus, the amount of nonsolvent added to the solution to be used in this example is 10/18 × 100, or 55.5% of the amount needed to cause initial indications of a colloidal dispersion.

The water-modified polymer solution, still apparently free of any colloidal polymeric milky iridescence, is applied by means of a doctor knife to one side of a porous nonwoven fabric to a wet-film thickness of 65 mils (0.065 inch). The nonwoven fabric is a polyurethane elastomer impregnated fibrous sheet prepared in accordance with the teaching in Example 1 of U.S. patent application S.N. 835,431 filed August 24, 1959. It weighs 6.5 ounces per square yard and is made by needle-punching a batt of 0.5 denier retractable poly(ethyleneterephthalate) fibers followed by impregnation with about 35%, based on the batt's fiber content, of a hydrazine-extended polyurethane elastomer similar to the one described above in this example, except the chain-extender used consists entirely of hydrazine. The temperature in the room during the coating operation is 21° C. and the relative humidity is 20%, a desirable room atmosphere for coating.

The layer of polymer solution applied to the nonwoven fabric is coagulated rapidly into a porous structure by floating the coated material coating-side-down on a body of liquid consisting of a 90:10 blend of dimethyl formamide and water at 27° C. for 30 seconds, followed by completely immersing it in the liquid for 2.5 minutes. Examination of the surface and cross-sections of the coagulated layer without the use of a lens shows it to be substantially free of macropores, but microscopic examination reveals a structure of interconnected micropores.

The coated material is then immersed in a water bath at 16° C. for 10 hours to remove substantially all of the dimethyl formamide.

Finally, the coated fabric is dried in a 100° C. heat zone. When dry, the microporous polymeric coating is white in color, about 15 mils in thickness, and it is highly permeable to water vapor. It can be colored, buffed and otherwise subjected to finishing operations known to be useful on leather and leather replacements. It can also be given a heat treatment at 165° C. for 5 minutes with a resulting improvement in abrasion resistance.

The product has a water vapor permeability value of 6,000. This value, also referred to as LPV, or leather permeability value, is measured by the test described by Kanagy and Vickers in the Journal of the Leather Chemists Association, vol. 45, pp. 211–242, dated April 19, 1950. The surface of the product is unusually smooth and uniform in appearance.

The product is useful as a leather replacement material for shoe uppers, upholstery, handbags, jackets, caps, hat linings and bearings.

Especially important properties of the product with respect to its utility as a shoe-upper material are: (a) its comfort characteristics such as flexibility, softness on the foot-contacting fibrous substrate side, breathability, and capacity to repel water when worn in the rain; (b) its appearance and finishing characteristics, including the absence of macropores throughout the thickness of the coating, thus allowing the surface to be subjected to such finishing operations as napping, buffing, polishing, staining and embossing without danger of exposing unsightly holes; and (c) its durability, including resistance to tearing, repeated flexing and abrasion.

*Example 2*

A 16% solution in dimethyl formamide of a polyurethane:polyvinyl chloride blend in a 65:35 weight ratio is prepared in a manner similar to that described in Example 1. The polyurethane elastomer is from a different batch and therefore might have slightly different properties from the one used in Example 1, although the conditions under which it is made are maintained as closely the same as possible.

Next, 15 parts of the nonsolvent-solvent blend of Example 1 (water:dimethyl formamide blend in a 1:4 ratio) are gradually added to 150 parts of the polymer solution with stirring. The amount of nonsolvent added to the solution, therefore, is $15/28 \times 100$, or 53.6% of the amount needed to cause initial indications of a colloidal dispersion. The procedure from here is the same as in Example 1 except (a) the layer of polymer solution on the nonwoven fabric is coagulated by immersing the coated material at once in the body of 90:10 liquid coagulating bath) at 50° C. for 5 minutes; and (b) the coated material is then immersed in a running-water bath at 20° C. for 24 hours, followed by a one hour immersion in boiling water. The boiling step is believed to render the cellular structure more resistant to collapse during oven drying.

When dry, the product has good water vapor permeability and it has utility similar to the product of Example 1.

*Example 3*

Example 2 is repeated with the following exceptions:
(a) The amount of nonsolvent added to the solution is $22/28 \times 100$, or 78.6% of the amount needed to cause initial indications of a colloidal dispersion.
(b) The dimethyl formamide:water ratio in the coagulating bath is 80:20, and the coated material is floated coating-side-down on the surface of the bath for 30 seconds, followed by complete immersion for 5 minutes.

When dry, the product has an LPV (leather permeability value) of 8300, an edgewear abrasion resistance of 1000 cycles (using dry #10 duck to apparent roughening). After the product is heat treated in an oven at 165° C. for 5 minutes and cooled to room temperature, it has an edgewear abrasion resistance of over 2000 cycles and a Shildknecht flex resistance of over 10 million cycles. The utility of the product is the same as described in Example 1.

Similar results are obtained when a 70:30 dimethyl formamide:water coagulating bath is substituted for the 80:20 bath in Example 3.

In making a control sample for purposes of comparison, Example 3 is repeated except the 80:20 coagulating bath is replaced with a 100% water bath. The product has pores visible to the unaided eye scattered throughout the porous structure of the coating. These macropores greatly restrict the utility of the product because of their deleterious effect on appearance, finishing characteristics, water repellence and durability.

*Example 4*

Example 2 is repeated with the following exceptions:
(a) No water or other nonsolvent is added to the polymer solution.
(b) The dimethyl formamide:water ratio in the coagulating bath is 93:7, and the coated material is floated coating-side-down on the surface of the bath for one minute, followed by complete immersion for 9 minutes.

When dry, the product has fair water vapor permeability and it has utility similar to the product of Example 1.

*Example 5*

Example 2 is repeated with the following exceptions:
(a) The polyurethane:polyvinyl chloride weight ratio in the 16% polymer solution is 80:20.
(b) The amount of nonsolvent (water) added to the polymer solution is 72% of the amount needed to cause initial indications of a colloidal dispersion.
(c) The dimethyl formamide:water ratio in the coagulating bath is 80:20, and the coated material is floated coating-side-down on the surface of the bath for one minute, followed by immersion for 9 minutes.
(d) When the coated material is first immersed in the water bath, the water temperature is 50° C. During the first 30 minutes of immersion, the water temperature is allowed to drop about one degree per minute as the bath cools to room temperature.

The dried product has properties and utility similar to the product of Example 3.

*Example 6*

A 16% solution in dimethyl formamide of a polyurethane:polyvinyl chloride blend in an 80:20 weight ratio is prepared, the polyurethane elastomer being as described in Example 1.

Next, a hydrophilic thickening agent known as "Carbopol 934" (a carboxy vinyl polymer of high molecular weight supplied by B. F. Goodrich Chemical Co.) is added to the polymer solution in an amount equal to 1.5% by weight of the polymer solid content of the solution. After the thickening agent has been thoroughly dispersed in the solution, the solution has a viscosity of 400 poises at 24° C.

The thickened solution is subjected to subatmospheric pressure in a vacuum chamber for removal of entrapped bubbles and it is filtered through cheese cloth for removal of any large particles that might be present.

The polymer solution, to which no water or other liquid nonsolvent for the polymer has been added, is then applied by means of a doctor knife to one side of the porous nonwoven fabric described in Example 1 to a wet-film thickness of 30 mils.

The viscous layer of polymer solution on the nonwoven fabric is coagulated rapidly into a microporous structure by floating the coated material coating-side-down on a body of liquid consisting of a 90:10 blend of dimethyl formamide and water at 24° C. for 30 seconds, followed by completely immersing it in the liquid for 2 minutes.

Then the coated material is immersed in a water bath having an initial temperature of 50° C. During the first 30 minutes of immersion, the water temperature is allowed to drop about one degree per minute as the bath cools to room temperature. Immersion is continued for 24 hours, followed by a one hour immersion in boiling water.

Finally, the coated fabric is dried in a 100° C. heat zone. When dry, the highly vapor permeable microporous polymeric coating can be colored, buffed or otherwise subjected to finishing operations known to be useful on natural leather. The product, which has an LPV of 6,000, has properties and utility similar to the product of Example 1.

Similar results are obtained if the thickening agent used in Example 6 is replaced with another known material capable of forming a viscous sol at a relatively low concentration, such as one of the following: methyl cellulose, sodium carboxymethyl cellulose, polyacrylate salts, polyvinyl alcohol or certain copolymers of methyl vinyl ether and maleic anhydride.

*Example 7*

Water is gradually added to a 22% solution in tetrahydrofuran of polyvinyl chloride resin. The amount of water added is equal to 91.2% of the amount which would be needed to cause initial indications that the solution is becoming a substantially colloidal polymeric dispersion.

The resulting water-modified polymer solution is applied by means of a doctor knife to one side of the porous nonwoven fabric described in Example 1 to a wet-film thickness of 30 mils.

Next, the layer of polymer solution on the nonwoven fabric is coagulated into a microporous structure by floating the coated material coating-side-down on a body of liquid consisting of a 90:10 blend of tetrahydrofuran and water at 24° C. for 30 seconds, followed by completely immersing it in the liquid for 5 minutes. Then the coated material is immersed in a body of liquid consisting of a 10:90 blend of tetrahydrofuran and water at 24° C. for 5 minutes.

Finally, the coated fabric is dried in a 100° C. heat zone. During drying, the coagulated layer becomes substantially free of tetrahydrofuran before it becomes substantially free of water, thus preventing any undue collapse of the cellular structure. The dried vapor permeable product is useful as a shoe insole.

A battery plate separator material can be made by repeating the above example except the layer of polymer solution is applied to a polished glass plate, and the resulting microporous polyvinyl chloride film is removed from the glass plate after the bathing and drying steps.

I claim:

1. A method of making vapor permeable sheet materials which comprises (a) applying to a substrate a layer of a solution of polymer in an organic solvent, (b) bathing the layer with a mixture of an organic solvent for the polymer and a nonsolvent for the polymer that is at least partially miscible with said solvent until the layer is coagulated into a cellular structure of interconnected micropores, the solvent:nonsolvent weight ratio in said mixture being about from 10:90 to 95:5, (c) removing substantially all of the solvent from the layer, and (d) removing substantially all of the nonsolvent from the resulting substantially solvent-free microporous layer; the polymer in step (a) being selected so that it will have a maximum elastic deformation strength of at least 100 pounds per square inch from the end of step (c) until the end of step (d).

2. A method of making vapor permeable sheet materials which comprises (a) applying to a substrate a layer of a solution of polymer in an organic solvent, (b) bathing the layer with a mixture of an organic solvent for the polymer and a nonsolvent for the polymer that is at least partially miscible with said solvent until the layer is coagulated into a cellular structure of interconnected micropores, the solvent:nonsolvent weight ratio in said mixture being about from 10:90 to 95:5, (c) drying the layer until substantially all the solvent has been removed therefrom, and (d) further drying the layer until substantially all the nonsolvent has been removed from the resulting substantially solvent-free microporous structure; the polymer in step (a) being selected so that it will have a maximum elastic deformation strength of at least 100 pounds per square inch from the end of step (c) until the end of step (d); the polymer solvent in steps (a) and (b) being selected so that it is more volatile than said nonsolvent.

3. A method of making vapor permeable sheet materials which comprises (a) applying to a substrate a layer of a solution of polymer in an organic solvent, (b) bathing the layer with a mixture of an organic solvent for the polymer and a nonsolvent for the polymer that is at least partially miscible with said solvent until the layer is coagulated into a cellular structure of interconnected micropores, the solvent:nonsolvent weight ratio in said mixture being about from 10:90 to 95:5, (c) bathing the layer with a nonsolvent for the polymer that is at least partially miscible with said solvent until the layer is substantially free of said solvent, and (d) drying the resulting substantially solvent-free microporous layer; the polymer in step (a) being selected so that it will have a maximum elastic deformation strength of at least 100 pounds per square inch from the end of step (c) until the end of step (d).

4. A method as defined in claim 3 wherein a thickening agent is admixed with the polymer solution before it is applied to the substrate, thereby increasing the viscosity of the solution.

5. A method as defined in claim 3 wherein the solvent:nonsolvent weight ratio in the bathing mixture employed in step (b) is about from 50:50 to 95:5.

6. A method as defined in claim 5 wherein a major proportion of the polymer consists of a polyurethane elastomer formed by reacting an organic diisocyanate with an active hydrogen containing polymeric material selected from the group consisting of polyalkyleneether glycols and hydroxyl-terminated polyesters to produce an isocyanate-terminated polyurethane prepolymer, and reacting the resulting prepolymer with a chain extender comprising a compound having two active hydrogen atoms bonded to amino-nitrogen atoms.

7. A method as defined in claim 6 wherein a minor proportion of the polymer consists of a vinyl chloride polymer.

8. A method as defined in claim 7 wherein the solvent is predominantly dimethyl formamide and the non-solvent is predominantly water throughout the method.

9. A method as defined in claim 8 wherein said substrate is a porous fibrous sheet material, and the dried microporous layer is integrally united thereto.

10. A method as defined in claim 3 wherein a nonsolvent for the polymer that is at least partially miscible with said solvent is admixed with the solution of polymer prior to step (a) in an amount up to but not including that which starts to transform the solution into a substantially colloidal polymeric dispersion.

11. A method as defined in claim 10 wherein the amount of nonsolvent added to the solution is about 40–95% of that which starts to transform the solution into a substantially colloidal polymeric dispersion.

12. A method as defined in claim 10 wherein the amount of nonsolvent added to the solution is about 70–90% of that which starts to transform the solution into a substantially colloidal polymeric dispersion.

13. A method as defined in claim 11 wherein the solvent:nonsolvent weight ratio in the bathing mixture employed in step (b) is about from 50:50 to 95:5.

14. A method as defined in claim 11 wherein the solvent:nonsolvent weight ratio in the bathing mixture employed in step (b) is about from 70:30 to 90:10.

15. A method as defined in claim 13 wherein said substrate is a porous fibrous sheet material, and the dried microporous layer is integrally united thereto.

16. A method as defined in claim 15 wherein said porous fibrous sheet material is a nonwoven fabric.

17. A method as defined in claim 13 wherein a major proportion of the polymer consists of a polyurethane elastomer formed by reacting an organic diisocyanate with an active hydrogen containing polymeric material selected from the group consisting of polyalkyleneether glycols and hydroxyl-terminated polyesters to produce an isocyanate-terminated polyurethane prepolymer, and reacting the resulting prepolymer with a chain extender comprising a compound having two active hydrogen atoms bonded to amino-nitrogen atoms.

18. A method as defined in claim 17 wherein a minor proportion of the polymer consists of a vinyl chloride polymer.

19. A method as defined in claim 18 wherein the solvent is predominantly dimethyl formamide and the nonsolvent is predominantly water through the method.

20. A method as defined in claim 13 wherein the solvent is predominantly dimethyl formamide and the nonsolvent is predominantly water throughout the method.

21. A method of making a flexible leather-like vapor permeable sheet material which comprises (a) admixing water with a solution of polymer in dimethyl formamide in an amount equal to about 70–90% of that which would start to transform the solution into a substantially colloidal polymeric dispersion, said polymer being a blend of a major proportion of a polyurethane elastomer formed by reacting an organic diisocyanate with an active hydrogen containing polymeric material selected from the group consisting of polyalkyleneether glycols and hydroxyl-terminated polyesters to produce an isocyanate-terminated polyurethane prepolymer, and reacting the resulting prepolymer with a chain extender comprising a compound having two active hydrogen atoms bonded to amino-nitrogen atoms, and a minor proportion of a vinyl chloride polymer, said polymer blend being selected so that it will have a maximum elastic deformation strength of at least 100 pounds per square inch from the end of the second bathing step to follow until the end of the drying step;

(b) applying a layer of the resulting mixture to a porous fibrous sheet material;

(c) bathing the layer with a mixture of dimethyl formamide and water until it is coagulated into a cellular structure of interconnected micropores, the dimethyl formamide:water weight ratio in the bathing mixture being about from 70:30 to 90:10;

(d) bathing the layer with water until it is substantially free of dimethyl formamide; and (e) drying the resulting completely bathed layer and the porous fibrous sheet material integrally united thereto.

22. A method as defined in claim 21 wherein said porous fibrous sheet material is a woven fabric.

23. A method as defined in claim 21 wherein said porous fibrous sheet material is a polyurethane elastomer impregnated nonwoven fabric.

References Cited by the Examiner

UNITED STATES PATENTS

| | | | |
|---|---|---|---|
| 2,824,816 | 2/58 | Somerville et al. | 117—135.5 |
| 2,848,752 | 8/58 | Bechtold | 117—36.7 XR |
| 3,000,757 | 9/61 | Johnston et al. | 117—63 |
| 3,067,482 | 12/62 | Hollowell | 117—63 XR |
| 3,100,721 | 8/63 | Holden | 117—135.5 |

WILLIAM D. MARTIN, *Primary Examiner.*

RICHARD D. NEVIUS, *Examiner.*

UNITED STATES PATENT OFFICE
CERTIFICATE OF CORRECTION

Patent No. 3,208,875                      September 28, 196

Ellsworth K. Holden

It is hereby certified that error appears in the above numbered patent requiring correction and that the said Letters Patent should read as corrected below.

Column 1, line 67, for "accurataely" read -- accurately -- column 3, lines 9 and 10, strike out "blends thereof with additives, for example curatives, coloring agent, plasticizers stabilizers and fillers." and insert instead -- amine, m-phenylene-diamine, 1,4-diaminopiperazine, ethylene diamine and mixtures thereof. --; column 9, line 20, for "10.90" read -- 10:90 --; column 11, line 72, for "15/18 × 100" read -- 15/28 × 100 --; column 15, line 44, for "through" read -- throughout --.

Signed and sealed this 12th day of April 1966.

(SEAL)
Attest:

ERNEST W. SWIDER                      EDWARD J. BRENNER
Attesting Officer                       Commissioner of Patents